3,109,732
REDUCTION OF FERRIC IONS IN
AQUEOUS SOLUTIONS
Mayer B. Goren, Denver, Colo., assignor to Kerr-McGee Oil Industries, Inc., a corporation of Delaware
No Drawing. Filed June 15, 1960, Ser. No. 36,163
16 Claims. (Cl. 75—101)

This invention relates to a novel process for the reduction of ferric ion to ferrous ion in aqueous media using a water-soluble substance yielding sulfite ion or bisulfite ion as the reductant in the presence of activated carbon as a catalyst.

In various chemical processes and especially in the hydrometallurgical field, it is frequently necessary or desirable to eliminate the deleterious effects of ferric ion in order to permit subsequent processing steps to be practiced. Examples of such processes include the decomposition of alkali chlorotitanates to produce titanium tetrachloride, the solvent extraction of metal values in hydrometallurgical processes, and the recovery of copper, titanium, and vanadium in hydrometallurgical processes where ferric ion is present in aqueous solution.

The deleterious effects of ferric ion may be eliminated by either chelating with a suitable chelating agent or by reducing the ferric ion to ferrous ion. Of these processes, the reduction process is generally preferred in the hydrometallurgical art. The ferric ion content of acidic leach liquors has been reduced heretofore by treating the liquor with scrap iron or aluminum and, while the ferric ion content of the liquor is reduced by this process, certain disadvantages are present which render the process unsatisfactory. For example, the hydrogen produced is a fire and explosion hazard, the free acid content of the liquor is lowered, and cutting oils or other contaminates on the scrap metal may present operational problems in solvent extraction operations due to the detergent content. Sulfide-type reductants such as sodium or potassium sulfide also have been used to reduce ferric ion, but these substances are unsatisfactory due to their offensive odor, poisonous nature and their ability to precipitate group II metal values such as copper, arsenic, bismuth and lead.

One prospective reductant that would overcome the above-mentioned disadvantages which has been considered for the reduction of ferric ion to ferrous ion is sulfur dioxide in either the gaseous form or aqueous solution (sulfurous acid). Thermodynamically, sulfur dioxide should be ideally suited for this purpose since the sulfite-sulfate ion couple appears to have sufficient potential to readily reduce the ferric-ferrous ion couple. Unfortunately, results are disappointing in the absence of a catalyst since the rate of reduction is very slow and the reaction seldom goes to completion even upon warming the solution to a temperature near the boiling point of water. One effective catalyst is thiocyanate ion and, as disclosed in my copending application Serial No. 741,716, now U.S. Patent No. 2,959,462, it has been discovered that thiocyanate ion possesses highly unusual properties for catalyzing the reduction of ferric ion by sulfur dioxide or its equivalents.

There are other catalysts for the above mentioned sulfur dioxide-ferric ion reaction. In accordance with one process, ferric ion is reduced in aqueous solution by means of sulfur dioxide under the catalytic influence of activated carbon. In practicing the process, the aqueous solution containing ferric ion may be passed through a vessel packed with substantially pure activated carbon and sulfur-dioxide gas is passed through the vessel countercurrent to the solution. However, this process has failed from a commercial standpoint as it is entirely unsatisfactory in the rate of reduction and the amount of ferric ion reduced to ferrous ion, the efficiency of utilization of the sulfur dioxide reductant, and the capacity of the catalyst bed.

I have made the surprising discovery that the above mentioned difficulties may be overcome and the process made economic by the expedient of passing an aqueous solution containing ferric ion and the reductant concurrently through a bed of activated carbon rather than countercurrently. Unexpectedly, this not only results in more efficient utilization of the reducing agent, but ferric ion also is much more quickly and completely reduced to ferrous ion and the capacity of the activated carbon bed is increased many times.

It is an object of the present invention to provide a novel process for reducing ferric ion to ferrous ion in aqueous medium using a reductant which is a water-soluble substance yielding sulfite ion or bisulfite ion in solution.

It is a further object of the present invention to provide a novel process whereby sulfur-dioxide and its equivalents may be used effectively as a reductant when reducing ferric ion to ferrous ion in an aqueous medium.

It is still a further object of the present invention to provide a novel process for reducing ferric ion contained in hydrometallurgical leach liquors using a reductant which is a water-soluble substance yielding sulfite ion or bisulfite ion in the presence of activated carbon as a catalyst.

Still other objects and advantages of the invention will be apparent to those skilled in the art upon reference to the following detailed description and the specific examples.

In accordance with a presently preferred embodiment of the invention, ferric ion contained in an aqueous medium is effectively reduced to ferrous ion by means of a reductant which is a water-soluble substance yielding sulfite ion or bisulfite ion by passing the aqueous solution and the reductant concurrently through a bed of activated carbon.

In practicing the process of the invention, preferably the reductant is added to the aqueous solution containing ferric ion prior to passing the same through the bed of activated carbon. However, the reductant and the aqueous solution may be added to a packed column near the entrance end, or both the aqueous solution and reductant may be added together at the point of entry into a packed column. By either method of adding the reductant and the aqueous solution, the two pass concurrently through the bed of activated carbon and the unusual and unexpected results characteristic of the present invention are obtained.

The reducing agent for use in practicing the present invention may be any suitable water-soluble substance which yields sulfite ion or bisulfite ion in aqueous solution such as, for example, sulfur dioxide, sulfurous acid, and water-soluble sodium, potassium and ammonium sulfites and bisulfites. Usually sulfur dioxide is the preferred source of sulfite ion for economic reasons and it may be added to an aqueous medium containing ferric ion to be reduced in the form of gaseous sulfur dioxide or an aqueous solution such as, for example, an aqueous solution containing about 5–7% sulfur-dioxide by weight (sulfurous acid).

Usually, it is preferred that an excess of reducing agent be added to the aqueous media to be treated but, in instances where a fast reduction rate or reduction of substantially the entire ferric ion content are not of importance, approximately stoichiometric amounts may be used in the absence of other more easily reducible substances. Preferably, about 1 to 4 stoichiometric equivalents of the reducing agent are added to the aqueous solution, based upon the ferric ion content. When sulfur dioxide is the reducing agent, usually it is preferred that the sulfur dioxide dosage be from about 0.55:1 to about 2.5:1 on a weight basis of sulfur dioxide ($SO_2$) to ferric ion ($Fe^{+3}$). The upper limit on the amount of reducing agent to be added appears to be largely economic in nature as there is substantially no tendency to over-reduce. Thus, a large excess of reducing agent may be added when desired.

The above-mentioned quantities of reducing agent do not include the amount that may be required for reduction of other substances more easily reduced than ferric ion which may be present. Thus, when the solution contains substances more easily reduced than ferric ion and which are reducible by the reducing agent in preference to ferric ion, an additional quantity of reducing agent should be added to provide for the reduction of such easily reducible substances and thereby assure the presence of sufficient reducing agent for reduction of the ferric ion content. Regardless of the amount of sulfur-dioxide used, the process of the invention results in much more efficient use of the reducing agent, as well as more complete reduction of the ferric ion content. Additionally, the capacity of a given packed column is increased remarkably when it is operated in accordance with the invention.

The invention is useful in treating a wide variety of aqueous solutions containing a substance providing ferric ion. For instance, suitable aqueous solutions for treatment in accordance with the present invention include substantially pure solutions prepared by dissolving a ferric salt in water, hydrometallurgical leach liquors containing iron values, industrial liquors containing ferric ion, etc. In general, the presence of dissolved substances other than the substance which is the source of ferric ion does not appear to have an adverse effect provided sufficient reducing agent is present to reduce any additional substances in the solution which are more easily reducible by the reducing agent than ferric ion, as well as to reduce the ferric ion to ferrous ion.

The rate of reduction at a given dosage of reducing agent and catalyst increases with an increase in temperature, and operation at elevated temperatures such as 120 to 140° F. or higher may be useful. However, ferric ion may be readily reduced to ferrous ion at normal ambient temperatures such as, for example, 60–90° F., and thus elevated temperatures are not necessary. Usually, temperatures below 110° F. are preferred.

The present invention is especially useful for reducing the ferric ion content of acidic aqueous hydrometallurgical leach liquors. For instance, to achieve high level solubilization of metal values in processing certain ores, the ores may be leached with a mineral acid under oxidizing conditions or in the presence of an oxidizing agent such as manganese dioxide or sodium chlorate. The leach liquors thus obtained frequently contain considerable quantities of ferric ion as well as ferrous ion, the ratio of the two being reflected in the electromotive force (E.M.F.) of the solution. For example, an acidic leach liquor having a pH of 1.0 to 1.5 or less and obtained by high level solubilization techniques may have a high negative E.M.F. such as about −375 to −400 millivolts (mv.), as measured by a platinum vs. saturated calomel electrode which indicates that the ratio of ferric ion to ferrous ion is high. If the liquor is reduced to an E.M.F. below about −300 mv. the ferric ion largely disappears and the conventional thiocyanate test for ferric ion is essentially negative. However, if the reduction proceeds too far as is often the case when reducing with scrap iron or aluminum, certain metal values present in a variety of leach liquors may also be reduced and such reduction may be deleterious to the subsequent processing of the liquors. This difficulty is not encountered when sulfur dioxide and its equivalents are used as the reductant. The markedly efficient utilization of the reducing agent and the greatly increased capacity of the reduction column when operating in accordance with the present invention offer economic advantages which are not approached by the prior art process.

The reduction of ferric ion in aqueous solution in accordance with the present invention generally proceeds more rapidly at higher pH levels up to the point where the ferric ion content is precipitated (usually about pH 3), but the reduction is satisfactory at much lower pH levels such as less than 1. Thus, pH levels of about 3 or lower generally are very satisfactory.

In instances where the feed liquor is very high in ferric ion content, due to the limited solubility of sulfur dioxide in water (about 6%), it may be desirable to feed the sulfur dioxide in increments rather than all at once. In this embodiment of the invention, a portion of the sulfur dioxide required to reduce the ferric ion content may be fed with the feed liquor and additional increments may be added in one or more stages further along the path of the feed liquor through the column as the sulfur dioxide content of the liquor is depleted. For example, one increment of sulfur dioxide may be fed in with the liquor, a second increment may be injected into the column at a position where a substantial amount of the original sulfur dioxide feed is depleted, a third increment injected at a position where a substantial amount of the second increment is depleted, etc. The liquor and sulfur dioxide may be passed concurrently either down or up the column, as desired.

The foregoing detailed description and the following specific examples are for the purpose of illustration only, and are not intended as being limiting to the spirit or scope of the appended claims. The E.M.F. measurements in the examples were made using a platinum vs. saturated calomel electrode.

EXAMPLE I

This example illustrates the results obtained with countercurrent operation of the treating column.

A .75″ diameter glass column provided with suitable supports, influent and effluent lines, was filled to a height of approximately 12 inches with 80 ml. of granular, relatively coarse (10–20 mesh) commercial activated charcoal. The void volume of the charcoal was about 40%. A feed line for iron-containing acid leach solution to be treated was fitted to introduce liquor at the top of the column. The top of the column was vented to a caustic trap so that any escaping $SO_2$ could be collected and its quantity determined. A second feed line was provided near the bottom of the charcoal column to allow introduction of gaseous sulfur dioxide. The gaseous sulfur dioxide was supplied through a micro gas washing bottle serving as a bubble counter so that the feed could be visually monitored. The effluent line from the column led to a U-tube set up in such a manner that a liquid seal was formed between the bottom of the column and the atmosphere in order to prevent escape of $SO_2$ and to force it instead up the charcoal column and countercurrent to the descending feed liquor. The feed liquor was an acid leach liquor containing quantities of iron in both ferric and ferrous states and had the following partial composition:

| | | |
|---|---|---|
| $Fe^{+2}$ | g./l. | 1.90 |
| $Fe^{+3}$ | g./l. | 2.19 |
| $SO_4^=$ | g./l. ca. | 100 |
| pH | | 0.8 |

The potential (electromotive force, i.e., E.M.F.) set up between a platinum and saturated calomel cell immersed in this solution was −405 millivolts (mv.). Experience has shown that with the leach liquor under consideration an E.M.F. of about −300 mv. or below indicates substantially all of the iron is in the ferrous state. This was substantiated by the usual qualitative tests, viz., the thiocyanate or ferrocyanide tests for ferric iron were negative at or below an E.M.F. value of −300 mv. Thus, it is possible to follow the course of the reduction qualitatively either through use of these tests or by measuring the E.M.F. of the effluent liquors.

One object of this example, which illustrates countercurrent operation of the column, was to determine, for a given feed rate of leach liquor, the amount of sulfur dioxide which needed to be introduced countercurrently in order to achieve reduction of the leach liquor to approximately −300 mv., and more particularly to determine the quantity of excess sulfur dioxide present in the effluent liquor and thus the efficiency. A number of tests were carried out in the following manner:

(1) The initial feed rate of the liquor was 25 ml./min., which bordered on flooded conditions for the liquor-charcoal contact. Sulfur dioxide was introduced via the feed line at the bottom of the column to flow countercurrent to the liquor, and when steady state conditions were established, samples of effluent were collected at intervals, the E.M.F. measured and the $SO_2$ contents determined by titration with standard iodine-KI solution. The column headed by "time" refers to the time elapsed after commencing operation of the column. The following results were obtained:

*Countercurrent Operation: Liquor Feed Rate 25 Ml./Min. Effluent*

| Time (min.) | E.M.F. (mv.) | Thiocyanate Test for $Fe^{+3}$ | $SO_2$ Conc. (g./l.) | Comments |
|---|---|---|---|---|
| 15 | −345 | Positive | 0.76 | |
| 25 | −350 | do | 1.14 | |
| 35 | −355 | do | 1.14 | At this point increased $SO_2$ feed rate. |
| 50 | −342 | do | 6.7 | Do. |
| 65 | −343 | do | 10.5 | Do. |

From the above results it was evident that economic reduction cannot be achieved at this feed rate (25 ml./min.) for the column in question. The data of the 65 min. run indicated $SO_2$ utilization to be less than 10% efficient. The $SO_2$ feed rate was reduced and the liquor feed rate was reduced to 16 ml./min. without achieving adequate reduction despite the presence of considerable unoxidized $SO_2$ in the effluent. Accordingly, the liquor feed rate was reduced to 10.2 ml./min. with the following results:

*Countercurrent Operation: Liquor Feed Rate 10 Ml./Min. Effluent*

| Time (min.) | E.M.F. (mv.) | Thiocyanate Test for $Fe^{+3}$ | $SO_2$ Conc. (g./l.) | Comments |
|---|---|---|---|---|
| 10 | −352 | Positive | 0.53 | |
| 20 | −357 | do | .38 | Increased $SO_2$ feed. |
| 35 | −348 | do | .76 | |
| 45 | −348 | do | .86 | Do. |
| 60 | −340 | do | 1.0 | |
| 70 | −332 | do | 1.4 | |
| 80 | −333 | do | 1.5 | Do. |
| 95 | −332 | do | 2.1 | |
| 110 | −300 | Negative | 3.2 | |

From the results it is evident that only at extremely inefficient utilization of $SO_2$ is it possible to achieve adequate reduction by countercurrent operation at even the very low flow rate of about 10 ml./min.

Analysis indicated that whereas only 1.26 g. $SO_2$ is required to reduce a liter of feed, to achieve adequate reduction (to an E.M.F. of −300) more than a three-fold excess needs to be fed in order to achieve such reduction at the 10 ml. flow rate. Accordingly, the efficiency of $SO_2$ utilization here is only about 28%.

The contact times for the various flow rates of feed liquor of this example are as follows, based on the void volume of the activated carbon as being 40%:

| Flow Rate, ml./min. | Contact Time, minutes | Adequate Reduction | Efficiency |
|---|---|---|---|
| 25 | 1.28 | No | Unsatisfactory (less than 10%). |
| 16 | 2.0 | No | Unsatisfactory. |
| 10 | 3.2 | Yes | Only 28%. |

EXAMPLE II

This example illustrates concurrent operation of the column in accordance with the invention wherein the sulfur dioxide or sulfurous acid is introduced into the feed liquor just before or very shortly after the influent oxidized liquor contacts the top of the activated carbon column. In other instances examined, aqueous $SO_2$ solution was dissolved in the feed before it entered the column, or the feed was gassed with sufficient $SO_2$ while in the "Feed Reservoir" with equally satisfactory results. The feed liquor for this example was the same as in Example I and the column was the same except as noted. In the specific instance of this example, a thin glass tube connected to the micro gas washing bottle was led into the top of the column and inserted about an inch into the charcoal. The charcoal was entirely immersed in feed liquor and flood feed was maintained throughout the operation so that the gaseous $SO_2$ was substantially entirely absorbed by the influent liquor. Again effluent was regularly monitored and analyzed for E.M.F., ferric iron content (qualitative) and total unreacted $SO_2$. The column in the table below headed by "efficiency" refers to efficiency of use of the $SO_2$. A number of liquor feed rates were investigated, the results being as follows:

*Concurrent Operation: Varying Liquor Feed Rate Effluent*

| Feed Rate, ml./min. | E.M.F. (mv.) | $SO_2$ Concn. (g./l.) | Efficiency, percent | Contact Time, min. | Reduction Adequate? |
|---|---|---|---|---|---|
| (A) 24 | −302 | <.09 | [1] >93 | 1.3 | Yes. |
| (B) 53 | −250 | 0.38 | 77 | 0.6 | Yes. |
| (C) 60 | −272 | 0.10 | 92 | 0.53 | Yes. |
| (D) 82 | −293 | | [1] 62 | 0.4 | Yes. |

[1] Steady state conditions not attained (w.r. to $SO_2$ feed); steady state efficiency would be higher (less $SO_2$ would be required).

In view of the above data and the data of Example I, it is evident that countercurrent operation is much less efficient than concurrent operation. For instance, the maximum feed rate of liquor for countercurrent operation at which adequate reduction (to an E.M.F. of −300) could be achieved even with inefficient $SO_2$ utilization (28%) was only 10 ml./min. for an 80 ml. charge of carbon (less than 13 volume percent per minute feed). On the other hand, concurrent operation in accordance with the invention at 92% $SO_2$ utilization and reduction to an E.M.F. of −272 could be carried out at feed liquor flow rates of 60 ml./min. (75 volume percent/min.). Thus, the column is surprisingly and unexpectedly far more efficient in reagent and column utilization and in terms of effective catalyst utilization in concurrent rather than countercurrent operation. Comparison of Examples I and II show contact time on the order of better than 3 minutes and with poor $SO_2$ utilization (28% efficiency) in the countercurrent method. In the concurrent method, contact time of as little as 0.5 minute gives complete reduction at 92% $SO_2$ utilization efficiency. Thus in the countercurrent method of Example I contact times at least six times as long are needed as in the concurrent operation. In other words to treat the same amount of liquor in a given time by the countercurrent method requires six times as much activated carbon and approximately three times as much $SO_2$ as is needed in the concurrent method of this example.

What is claimed is:

1. In a process for reducing ferric ion to ferrous ion wherein an aqueous medium containing a substance providing ferric ion is passed through a bed of activated carbon catalyst and ferric ion reduced to ferrous ion by means of a reductant which is a water-soluble substance yielding in aqueous solution a reducing ion selected from the group consisting of sulfite ion and bisulfite ion, the improvement in combination therewith comprising passing the aqueous medium and the reductant concurrently through the bed of activated carbon catalyst.

2. The process of claim 1 wherein about 1 to 4 stoichiometric equivalents of the reductant are added to the aqueous medium.

3. The process of claim 1 wherein the pH of the aqueous medium is not greater than 3 and the E.M.F. of the aqueous medium after treatment with the reductant is not greater than about −300 millivolts as measured with a platinum vs. saturated calomel electrode.

4. The process of claim 1 wherein the aqueous medium is a hydrometallurgical leach liquor containing iron values.

5. In a process for reducing ferric ion to ferrous ion wherein an acidic aqueous medium containing a substance providing ferric ion is passed through a bed of activated carbon catalyst and ferric ion reduced to ferrous ion by means of a reductant selected from the group consisting of sulfur dioxide, sulfurous acid, and water-soluble sodium, potassium and ammonium sulfites and bisulfites, the improvement in combination therewith comprising passing the aqueous medium and the reductant concurrently through the bed of activated carbon catalyst.

6. The process of claim 5 wherein about 1 to 4 stoichiometric equivalents of the reductant are added to the aqueous medium.

7. The process of claim 5 wherein the pH of the aqueous medium is about 1.0 to 1.5 and the E.M.F. of the aqueous medium after treatment with the reductant is not greater than about −300 millivolts as measured with a platinum vs. saturated calomel electrode.

8. The process of claim 5 wherein the aqueous medium is a hydrometallurgical leach liquor containing iron values.

9. In a process for reducing ferric ion to ferrous ion wherein an aqueous medium containing a substance providing ferric ion is passed through a bed of activated carbon catalyst and ferric ion reduced to ferrous ion by means of a reductant which is a water-soluble substance yielding in aqueous solution a reducing ion selected from the group consisting of sulfite ion and bisulfite ion, the improvement in combination therewith comprising dissolving the reductant in the aqueous medium and then passing the aqueous medium containing the dissolved reductant through the bed of activated carbon catalyst.

10. The process of claim 9 wherein about 1 to 4 stoichiometric equivalents of the reductant are added to the aqueous medium.

11. The process of claim 9 wherein the pH of the aqueous medium is not greater than 3 and the E.M.F. of the aqueous medium after treatment with the reductant is not greater than about −300 millivolts as measured with a platinum vs. saturated calomel electrode.

12. The process of claim 9 wherein the aqueous medium is a hydrometallurgical leach liquor containing iron values.

13. In a process for reducing ferric ion to ferrous ion wherein an aqueous acidic medium containing a substance providing ferric ion is passed through a bed of activated carbon catalyst and ferric ion reduced to ferrous ion by means of a reductant selected from the group consisting of sulfur dioxide, sulfurous acid, and water-soluble sodium, potassium and ammonium sulfites and bisulfites, the improvement in combination therewith comprising dissolving the reductant in the aqueous medium and then passing the aqueous medium containing the dissolved reductant through the bed of activated carbon catalyst.

14. The process of claim 13 wherein about 1 to 4 stoichiometric equivalents of reductant are added to the aqueous medium.

15. The process of claim 13 wherein the pH of the aqueous medium is about 1.0 to 1.5 and the E.M.F. of the aqueous medium after treatment with reductant is not greater than about −300 millivolts as measured with a platinum vs. saturated calomel electrode.

16. The process of claim 13 wherein the aqueous medium is a hydrometallurgical leach liquor containing iron values.

References Cited in the file of this patent

UNITED STATES PATENTS

| | | |
|---|---|---|
| 1,001,536 | Lilja | Aug. 22, 1911 |
| 2,231,181 | Brooks | Feb. 11, 1941 |

FOREIGN PATENTS

| | | |
|---|---|---|
| 200,852 | Great Britain | July 18, 1923 |